United States Patent [19]

Gerkin et al.

[11] Patent Number: 4,902,777

[45] Date of Patent: Feb. 20, 1990

[54] N-(POLYOXYALKYL)-N-(ALKYL)AMINES

[75] Inventors: Richard M. Gerkin; David J. Schreck; Danny E. Smith, all of Cross Lanes, W. Va.

[73] Assignee: Union Carbide Chemicals and Plastics Company, Inc., Danbury, Conn.

[21] Appl. No.: 176,217

[22] Filed: Mar. 31, 1988

Related U.S. Application Data

[63] Continuation-in-part of Ser. No. 67,822, Jun. 30, 1987, abandoned.

[51] Int. Cl.$^4$ .................. C08G 59/00; C07G 93/04
[52] U.S. Cl. ............................. 528/407; 564/505
[58] Field of Search ................. 564/505; 521/63; 528/407

[56] References Cited

U.S. PATENT DOCUMENTS

| | | | |
|---|---|---|---|
| Re. 28,715 | 2/1976 | Stamberger | 521/137 |
| Re. 29,118 | 2/1977 | Stamerger | 521/137 |
| 2,160,058 | 5/1939 | Covert | 564/291 |
| 2,629,740 | 2/1953 | Carnes | 564/487 |
| 2,636,902 | 4/1953 | Taylor et al. | 564/446 |
| 2,888,439 | 5/1959 | Simons | 252/453 |
| 2,888,440 | 5/1959 | Frazer et al. | 525/461 |
| 3,152,998 | 10/1964 | Moss | 502/315 |
| 3,179,606 | 4/1965 | Prescott et al. | 521/159 |
| 3,231,619 | 1/1966 | Speranza | 252/117 |
| 3,236,895 | 2/1966 | Lee et al. | 252/73 |
| 3,256,213 | 6/1966 | Gmitter | 524/726 |
| 3,267,050 | 8/1966 | Kuryla et al. | 521/163 |
| 3,269,999 | 8/1966 | Moore et al. | 106/14.18 |
| 3,309,182 | 3/1967 | Crowley et al. | 44/72 |
| 3,347,926 | 10/1967 | Zech | 544/78 |
| 3,352,916 | 11/1967 | Zech | 252/541 |
| 3,359,243 | 12/1967 | Criner | 524/726 |
| 3,373,204 | 3/1968 | Hales et al. | 564/347 |
| 3,383,417 | 5/1968 | Lichtenwalter | 5/55 R |
| 3,390,184 | 6/1968 | Moss et al. | 564/480 |
| 3,436,359 | 4/1969 | Hubin et al. | 521/163 |
| 3,580,952 | 5/1971 | Moschel | 564/467 |
| 3,625,871 | 12/1971 | Traubel et al. | 264/41 |
| 3,645,969 | 2/1972 | Harvey | 502/167 |
| 3,654,370 | 4/1972 | Yeakey | 564/480 |
| 3,660,319 | 5/1972 | Yeakey | 521/115 |
| 3,666,788 | 5/1972 | Rowton | 558/447 |
| 3,714,128 | 1/1973 | Rowton et al. | 521/163 |
| 3,832,323 | 8/1974 | Ramey et al. | 252/182.26 |
| 3,838,076 | 9/1974 | Moss et al. | 521/163 |
| 3,847,992 | 11/1974 | Moss | 521/164 |
| 4,062,820 | 12/1977 | Mitchell | 260/405.5 |
| 4,075,130 | 2/1978 | Naylor | 252/135 |
| 4,115,361 | 9/1978 | Schulze | 525/523 |
| 4,118,422 | 10/1978 | Klein | 544/98 |
| 4,119,615 | 10/1978 | Schulze | 428/474.4 |
| 4,146,700 | 3/1979 | Waddill | 525/504 |
| 4,146,701 | 3/1979 | Waddill | 525/523 |
| 4,152,353 | 5/1979 | Habermann | 564/374 |
| 4,153,581 | 5/1979 | Habermann | 252/472 |
| 4,180,644 | 12/1979 | Marquis | 528/68 |
| 4,184,024 | 1/1980 | Klein | 521/167 |
| 4,191,706 | 3/1980 | Marquis | 525/73 |
| 4,247,301 | 1/1981 | Honnen | 44/63 |
| 4,269,945 | 5/1981 | Vanderhider | 521/167 |
| 4,286,074 | 8/1981 | Davis et al. | 521/137 |
| 4,304,889 | 12/1981 | Waddill | 525/514 |
| 4,332,720 | 6/1982 | Schulze | 260/239.3 R |
| 4,390,645 | 6/1983 | Hoffman | 521/137 |
| 4,396,729 | 8/1983 | Dominquez | 521/112 |
| 4,417,075 | 11/1983 | Stogryn | 564/505 |
| 4,431,754 | 2/1984 | Hoffman | 521/137 |
| 4,431,790 | 2/1984 | Umeda | 528/73 |
| 4,433,067 | 2/1984 | Rice | 521/51 |
| 4,444,910 | 4/1984 | Rice | 521/51 |
| 4,448,904 | 6/1984 | Dominquez | 521/161 |
| 4,456,730 | 6/1984 | Balle | 524/839 |
| 4,471,138 | 9/1984 | Stogryn | 564/505 |
| 4,474,900 | 10/1984 | Dominquez | 521/120 |
| 4,474,901 | 10/1984 | Dominquez | 521/163 |
| 4,487,908 | 12/1984 | Dominquez | 528/76 |
| 4,487,912 | 12/1984 | Zimmerman | 528/52 |
| 4,499,038 | 2/1985 | Schafer et al. | 264/51 |
| 4,499,254 | 2/1985 | Dominquez | 528/49 |
| 4,506,039 | 3/1985 | Balle | 521/137 |
| 4,513,133 | 4/1985 | Dominquez | 528/49 |
| 4,526,972 | 7/1985 | Speranza | 546/191 |
| 4,530,941 | 7/1985 | Turner | 521/176 |
| 4,532,266 | 7/1985 | Rasshofer | 521/159 |
| 4,540,720 | 9/1985 | Rasshofer | 521/159 |
| 4,588,840 | 5/1986 | Gurgiold | 564/443 |
| 4,605,773 | 8/1986 | Maloney et al. | 564/505 |
| 4,642,320 | 2/1987 | Turner | 521/176 |
| 4,686,242 | 8/1987 | Turner | 521/137 |
| 4,705,814 | 11/1987 | Grigsby | 521/160 |
| 4,732,919 | 3/1988 | Grigsby | 521/159 |
| 4,845,133 | 7/1989 | Priester et al. | 521/167 |

FOREIGN PATENT DOCUMENTS

| | | |
|---|---|---|
| 147812 | 7/1985 | European Pat. Off. . |
| 3147736 | 6/1983 | Fed. Rep. of Germany . |
| 1466708 | 12/1966 | France . |
| 60-4519 | 2/1985 | Japan . |
| 000591 | 10/1986 | PCT Int'l Appl. . |
| 1033912 | 6/1966 | United Kingdom . |
| 1159962 | 7/1969 | United Kingdom . |

OTHER PUBLICATIONS

Amines via Exchange Realtions, H. Glaser, Houben–Weyl, Methoden der Organischen Chemie, vol. XI/1 (1957) pp. 126–134.

*Primary Examiner*—John Kight
*Assistant Examiner*—Dennis R. Daley
*Attorney, Agent, or Firm*—Paul W. Leuzzi

[57] ABSTRACT

N-(polyoxyalkyl)-N-(alkyl)amines are provided that are reactive with isocyanates to form polyurea and/or polyurethane urea polymers.

20 Claims, No Drawings

N-(POLYOXYALKYL)-N-(ALKYL)AMINES

This is a continuation-in-part of U.S. application Ser. No. 07/067,822, filed June 30, 1987, now abandoned.

BACKGROUND OF THE INVENTION

1. Field of the Invention

The present invention relates to a novel class of amines and in particular to N-(polyoxyalkyl)-N-(alkyl)amines. These amines have utility in the preparation of polyurea and polyurethane/urea polymers which are useful in the preparation of elastomers and foams.

2. Prior Art

Current urethane technoloqy offers potential end users a versatility unsurpassed by any other polymeric system. Using readily available intermediates and processing equipment, it is possible to prepare essentially solid polyurethanes ranging from very soft (40 Shore A) elastomers to very hard (80 Shore D) plastics, and foamed polymers ranging from one to thirty pounds per cubic foot in density. These polyurethanes have generally very good physical properties and as a result large markets have evolved around their use.

Four major categories of intermediates are used in the preparation of most typical urethane systems. These include: polyols, isocyanates, chain extenders and additives (including blowing agents).

Several classes of polyols have been used in the preparation of urethane polymers. These include polyesters, polycaprolactones, poly(1,4-butylene)oxides and polyoxyalkylene oxides based on propylene and ethylene oxides. Of these, the latter have found greatest utility in the industry. Typically, polyols of this type are prepared by allowing propylene oxide (with or without ethylene oxide) to react with an "initiator molecule" such as glycerine under base catalyzed conditions. When ethylene oxide is used, it can be incorporated either as an internal block or random sequence in the polyol backbone or as a cap. Capping serves to convert a majority of the normal secondary hydroxyl groups on the polyol to more reactive primary hydroxyl groups.

For many applications, polyurethanes based on polyols such as those described above allow suitable processing latitude and reactivity with isocyanates and give urethane polymers with acceptable properties. However, there are more rigorous applications that require greater reactivity, better physical properties, or both. These include such applications as high performance reaction injection molding (RIM) systems and new rapid demold foams and elastomers.

A class of compounds with the potential to meet these more rigorous demands is taught in U.S. Pat. No. 3,654,370 and provides the basis for later patents to Texaco regarding the use of amine terminated polyethers in RIM. These materials are amine terminated polyethers where the hydroxyl group of a conventional polyol has been replaced with a primary amine group using the well known reaction of ammonia with alcohols polyols) under catalyzed high temperature conditions in the presence of hydrogen. This patent discloses certain secondary amine polyethers. However, since ammonia (and not an alkyl substituted amine) was exclusively used as the aminating agent, the secondary amine they generate must be limited to the secondary amine from intra molecular reactions which is discussed in the patent. These secondary amines are significantly different from those of the present invention, where the amination product forms directly from reaction of polyol and a substituted amine and not from reaction of an amine terminated polyol with itself.

These amines are extremely reactive with isocyanates, potentially increasing the overall reactivity of the system, and they generate highly stable urea groups which enhance the properties of the polymer, particularly at elevated temperatures. While the primary amine terminated polyethers have found some utility, their acceptance has been limited due largely to their very high reactivity.

In U.S. Pat. No. 2,629,740 the alkyl groups on the amine terminated polyethers are all functionalized with hydroxy groups.

In U.S. Pat. No. 3,660,319 the amine terminated polyethers described are tertiary amines. As a result they are not reactive toward isocyanates.

In U.S. Pat. No. 3,666,788 the alkyl groups on these amine terminated polyethers are all functionalized with cyano groups.

U.S. Pat. No. 3,373,204 discusses a monoalkyl amine terminated polyether identified as "polyoxypropylene 10 sorbitol". The molecular weight of these derivatives was limited to only 2350 (approximately a 383 equivalent weight).

U.S. Pat. No. 4,286,074 describes a 1000 equivalent weight (2000 molecular weight "MW") polypropylene oxide based diamine where the amines are substituted with isopropyl qroups. The isolated amine was not characterized and was made using a different process than set forth in the present invention. In fact the process used required the preexistence of a primary amine terminated 2000 MW material to be successful. No other examples of alkyl amine substituted materials are given, and no utility was demonstrated for this compound.

U.S. Pat. No. 4,417,075 describes di(secondary and tertiary alkyl aminoalkoxyl)alkanes where the equivalent weight is limited to about 400.

U.S. Pat. No. 4,588,840 describes aromatic amine terminated polyethers made from aniline and a polyol. No aliphatic amines are discussed.

U.S. Pat. No. 4,605,773 describes secondary amine containing polyethers which are monoaminoalcohols. No diamines are presented.

The reaction of a primary amine with an alcohol is a known approach. However, U.S. Pat. No. 4,686,242 teaches that this approach actually produces an amine terminated polyether where the amine qroups are predominantly primary amines.

French Pat. No. 1,466,708 describes secondary amines made from reaction of an epoxy terminated polyether with a primary amine. These reaction products produce alkanol amines rather than pure secondary amines.

West German Pat. No. 3,147,736 discusses polyurea articles manufactured from various amine containing polyethers. The amine polyethers exemplified are primary amine containing products. Certain secondary amine containing polyether are discussed (i.e. Fr. 1,466,708 above), which are in fact alkanol amines.

OBJECTS OF THE INVENTION

It is an object of the present invention to provide a novel class of amines which can be employed in reaction with isocyanates to form polyureas and polyurethane/ureas.

It is another object of the present invention to provide amines with a reactivity with isocyanates which is slow enough to allow for a well controlled reaction, yet, is sufficiently fast enough to be commercially acceptable.

Other objects of the invention will be made apparent from the description and examples which follow.

SUMMARY OF THE INVENTION

The present invention provides a novel class of amines especially designed for reaction with isocyanates to form polyureas and polyurethane/ureas. These amines are N-(polyoxyalkyl)-N-(alyl)amines generally formed by reacting an alcohol, such as a monol or a polyol, with a substituted amine in the presence of an appropriate catalyst, such as a nickel.

These include propylene oxide, ethylene oxide, the alpha olefin oxides such as 1,2-epoxybutane and 1,2-epoxyoctadecane, oxetane, and tetrahydrofuran.

"H" denotes the group represented by the formula:

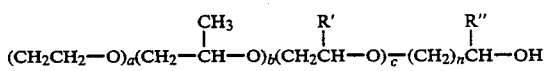

"P" denotes the group represented by the formula:

"S" denotes the group represented by the formula:

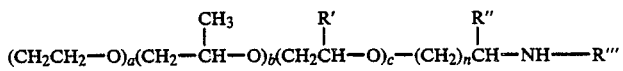

"T" denotes the group represented by the formula:

DETAILED DESCRIPTION OF THE INVENTION

In accordance with the present invention there are provided N-(polyoxyalkyl)-N-(alkyl)amines of the general formula:

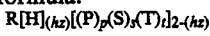

wherein R is an initiator radical based on a compound containing Zerewitinoff active hydrogen atoms. Such compounds are capable of initiating polymerization with alkylene oxides when used with a suitable catalyst (e.g., potassium hydroxide, zinc hexacyanocobaltate).

Examples of such compounds include but are not limited to: monofunctional compounds such as methanol, butanol, phenol, nonylphenol, lauryl alcohol, 2-methoxyethanol; difunctional compounds such as ethylene glycol, propylene glycol, water, 1,4-butanediol, diethylene glycol; trifunctional compounds such as trimethylolpropane, glycerine; and other polyfunctional compounds such as pentaerythritol, sorbitol, ammonia, ethylene diamine, 1,3-diaminopropane, 1,6-hexanediamine, isomers of phenylenediamine and toluenediamine, 4,4'-diphenylmethane diamine and its isomers, diethanolamine, ethanolamine, dimethylethanolamine N-methylethanolamine, triethanolamine, triisopropanolamine, ethylmercaptan, thiophenol and propylene disulfide.

Additional examples of compounds suitable for initiating polymerization of alkylene oxides are the various oligomeric polyols known in the art. These include the poly-(1,4 butylene oxide)polyethers and the hydroxyl and amine terminated poly-(butadienes). When polyols (or other oligomers) are used for initiating polymerization of the alkylene oxides, their molecular weights can range from 400 to about 3000. When the conventional initiators such as described above (i.e., glycerine, water, etc. are used, their molecular weight can range from about 18 (for water) up to about 400. Preferably R contains from two to six carbon atoms and most preferably three to six carbon atoms.

The alkylene oxides and monomers that find utility in the present invention are those well known in the art.

wherein:

The letter "a" defines the ethylene oxide content of the N-(polyoxyalkyl)-N-(alkyl)amine and can range from a value of zero to 175. The preferred range for "a" is 0 to 90. When b or c is not equal to zero, the most preferred range for "a" is 0 to 50.

The letter "b" defines the propylene oxide content of the N-(polyoxyalkyl)-N-(alkyl)amine and can also range from a value of zero to 175. Preferably, "b" should range from 20 to 115 and most preferably from 25 to 98.

The letter "c" defines the alpha olefin oxide

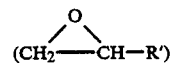

content of the N-(polyoxyalkyl)-N-(alkyl)amine and can range from 0 to 30. Preferably, "c" can range from zero to 15 and most preferably, from 0 to 2.

The letter "n" equals from 1 to 3, preferably 1.

Two aspects of a, b and c are important and must be noted. The first is that the sum of a+b+c must always be greater than or equal to 2 when n equals 1. Second, a, b and c indicate ethylene oxide, propylene oxide and alpha olefin oxide which can be incorporated into the product backbone in any sequence, i.e., blocks or random sequence, in any configuration.

R' is an alkyl group containing from two carbon atoms to eighteen carbon atoms depending on the alpha olefin oxide used in preparation of the amine. While R" can contain up to eighteen carbon atoms, two carbon atoms are most preferred.

R" is hydrogen or an alkyl group containing up to eighteen carbon atoms. It is preferred that R" is hydrogen or alkyl group containing up to two carbons, and most preferably a methyl group.

R'" and R"" are independently an alkyl group containing from two to twelve carbon atoms, preferably containing from two to six carbon atoms, and most preferably an isopropyl group.

The letter "h" indicates the relative hydroxyl content remaining after amination and is from 0 to 0.7, with 0 to 0.3 preferred and 0 to 0.15 most preferred. As noted, "h" is related to the percent amination, i.e. 30 percent amination would result in a hydroxyl content of 70 percent and thus "h" would equal 0.7. Values are obtained by taking the total amine number as measured in milliequivalents per gram, and dividing by the initial hydroxyl number (meq/g) and subtracting that quotient from 1.0.

The letter "p" indicates the relative primary amine content to total amine content formed during amination and is from 0 to less than 0.5, preferably 0 to 0.4.

The letter "s" indicates the relative secondary amine content to total amine content formed during amination and is from 0.5 to 1.0, preferably from 0.70 to 1.0.

The letter "t" indicates the relative tertiary amine content to total amine content formed during amination and is from 0 to 0.15, preferably from 0 to 0.05. The sum of p, s and t must equal 1.0.

The letter "z" is an integer derived from the number of Zerewitinoff active hydrogens on the initiator. The letter "z" is preferably 2 to 6, and most preferably 3 to 6, with the proviso that when "z" is 2 and a and c are zero, then b must be greater than 22.

These parameters describe N-(polyoxyalkyl)-N-(alkyl)amines with equivalent weights ranging from about 90 to about 10,000 or more when the functionality is between 1 and 6 and an equivalent weight of greater than 1250 when the functionality is two.

The N-(polyoxyalkyl)-N-(alkyl)amines of the present invention are prepared by direct, catalytic amination of an appropriate alcohol with an amine:

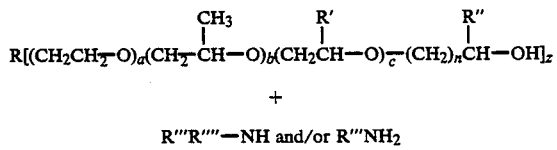

+

R'''R''''—NH and/or R'''NH$_2$

Representative amines useful in the invention are primary amines and secondary amines. Representative primary amine examples include but are not limited to: ethylamine, n-propylamine, isopropylamine, cyclohexylamine, laurylamine, t-butylamine and s-butylamine. Representative secondary amine examples include but are not limited to: diethylamine, di-n-propylamine, diisopropylamine, di-n-butylamine, diisobutylamine, di-2-ethylhexylamine, di-sec-butylamine, dioctylamine, n-ethyl-n-butylamine and diphenylamine. Use of these secondary amines tends to produce N-(polyoxyalkyl)-N-(alkyl)amines with higher than expected secondary amine content and surprisingly low tertiary amine content as described in copending patent application D-15856 filed concurrently. It is also anticipated that blends of primary and secondary amines can be used in the amination process. One method for preparing the secondary amine is described in U.S. Pat. No. 4,286,074, where a primary amine terminated polyether is allowed to react with acetone, with the resulting ketimine being hydrogenated to the product. Although this method is only exemplified for about 1000 equivalent weight materials, it is technically applicable to other molecular weights and functionalities. However, this approach is somewhat limited based on the availability of the primary amine terminated polyether.

In addition, the reaction of a primary amine with an alcohol (polyol) is known, however, U.S. Pat. No. 4,686,242 teaches that this approach actually produces an amine terminated polyether where the amine groups are predominantly primary amines.

The alcohols, and especially the monols and polyols used in the present invention, are well known in the art and commercially available from a variety of sources.

The reaction is carried out in a batch autoclave at elevated temperature, generally between 175° C. to 250° C. and preferably 190° C. to 240° C. The reaction pressure will range from 250 to 2000 psi, preferably 500 to 1250 psi. The reaction is run in the presence of hydrogen. Under these conditions the hydroxyl containing polymer remains in the liquid phase. The stoichiometry on a amine to hydroxyl equivalent basis will range from 2:1 to 20:1, preferably 5:1 to 10:1. The reaction will generally occur in 4 to 24 hours. The catalyst is a nickel, copper or cobalt based catalyst, most preferably nickel, either unsupported or on a support. When the catalyst is supported, it is preferred that the metal content of the catalyst be at least 25% with 50% or more preferred. The catalyst loading is generally on the order of 1 to 5 weight percent based on total charge.

In addition to the batch process described above, the amination can be carried out using a liquid phase continuous amination process. In this process, a pelletized or extruded form of the nickel, copper or cobalt catalyst, optionally on a support, is charged to a high pressure tubular reactor. Most preferably a nickel catalyst is employed. The reactor is heated to 175° C. to 250° C., preferably 190° C. to 240° C. and a mixture of amine and polyol (2:1 to 20:1, preferably 5:1 to 10:1 on an equivalents basis) is pumped through the reactor at a flow rate ranging from about 0.5 to 5.0 g feed/g catalyst/hr. Hydrogen is added to the feed stream at a minimum rate of 1 standard cc/min Reactor pressure is controlled by a back pressure regulator to 250 to 2000 psi, preferably 500 to 1200 psi. The products isolated from the continuous process are similar to those isolated from the batch process.

The N-(polyoxyalkyl)-N-(alkyl)amines of the present invention find utility in the preparation of polyureas and polyurethane-urea products.

In preparing polyurea, no polyol should be employed. In preparing polyurethane urea, the N-(polyoxyalkyl)-N-(alkyl)amine of the present invention is used in conjunction with a base polyol or other polyfunctional alcohol-containing materials.

The present invention provides a method for producing polyurea foams which include reacting: (a) a N-(polyoxylalkyl)-N-(alkyl)amine of this invention alone or in some instances in combination with other polymers with Zerewitinoff active hydrogen atoms, and (b) an organic polyisocyanate and optionally in the presence of (c) additives to produce the polyurea or polyurethane-urea product. When a foam is being prepared, these additives generally include catalyst, blowing agent, crosslinkers and foam stabilizers. The reaction and foaming operations can be performed in any suitable manner, preferably by the one shot technique.

The organic polyisocyanates that are useful in producing polyurea or polyurethane-urea elastomers in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene (TDI), methylene bis(4-cyclohexyl isocyanate), isophorone diisocyanate, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatodecane, 1,4-diisocyantocylohexane and isomers thereof, 1,10-diisocyanatopropyl)ether of 1,4-butylene glycol, 1,11-diisocyanatoundecane, 1,12-diisocyanatododecane bis(isocyanatohexyl) sulfide, 1,4-diisocyanatobenzene, 3,5-diisocyanato-o-xylene, 4,6-diisocyanato-m-xylene, 2,6-diisocyanato-p-xylene, tetramethylxylylene diisocyanate, 2,4-diisocyanato-1-chlorobenzene, 2,4-diisocyanato-1-nitrobenzene, 2,5-diisocyanato-1-nitrobenzene, 2,4' and 4,4'-diphenylmethane diisocyanate (MDI), and derivatives thereof 3,3-diphenyl-methylene diisocyanate, and polymethylene poly (phenyleneisocyanates) as described in the literature and in many patents, for example, U.S. Pat. Nos. 2,683,730; 2,950,263; 3,012,008; 3,344,162; and 3,362,979, and mixtures thereof.

Additional aromatic polyisocyanates include p-phenylene diisocyanate, polymethylene polyphenylisocyanate, dianisidine diisocyanate, bitolylene diisocyanate, naphthalene-1,4-diisocyanate, bis(3-methyl-3-isocyanatophenyl)methane, bis(3-methyl-4-isocyanatophenyl)methane, and 4,4'-diphenylpropane diisocyanate.

Any known catalysts useful in producing polyureas or polyurethane/urea foams may be employed. Representative catalysts include: (a) tertiary amines such as bis(2,2 -dimethylamino)ethyl ether, trimethylamine, triethylamine, N-methylmorpholine, N-ethylmorpholine, N,N-dimethylbenzylamine, N,N-dimethyle-thanolamine, N,N,N',N'-tetramethyl-1,3-butanediamine, triethanolamine, 1,4-diazabicyclo-[2.2.2]octane, hexamethylenetetramine, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis acetylacetone- alkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$ and the like wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; and (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide) dibutyltin-bis(2-dimethylaminopentylate), dibutyltin dichloride. dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

Representative crosslinker examples include but are not limited to: lycol amines; diethanolamine, triethanolamine, monoethanolamine, methyldiethanolamine, isopropanolamine, 2-hydroxyethylpiperazine, aminoethylethanolamine, 2-aminoethanol, diisopropanolamine, Quadrol®, amines; aminoethylpiperazine, p-phenylenediamine, m-phenylenediamine, glycols; sorbitol, ethylene glycol, glycerine.

When forming a polyurea or polyurethane foam, a blowing agent is employed in the reaction mixture. Suitable blowing agents, for example, include water generally from about 0.1 to about 10 weight percent, based upon total weight of N-(polyoxyalkyl)-N-(alkyl)amine and polyol or other suitable blowing agents which are vaporized by the exotherm of the reaction, or a combination of water and the other blowing agent. Illustrative polyurea and polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, formic acid, and the like. The generally preferred method of foaming for producing flexible foams is the use of water, or a combination of water plus a fluorocarbon blowing agent such as trichloromonofluoromethane. The quantity of blowing agent employed will vary with factors such as the density and hardness desired in the foamed product.

It is also within the scope of the invention to employ, when applicable, small amounts, e.g., about 0.001 percent to 5.0 percent by weight, based on the total reaction mixture, of a foam stabilizer or other nucleating agents. Suitable foam stabilizers or surfactants are known and may vary depending upon the particular application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254. The latter class of copolymers differs from the above mentioned polysiloxane-polyoxylakylene block copolymers in that the polysiloxane moiety is bonded to the polyoxy-alkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924. Siloxanes described in U.S. Pat. No. 3,194,733 are also useful.

Elastomers may also be prepared from the N-(polyoxyalkyl)-N-(alkyl)amines of the present invention. When forming such elastomers, a chain extender and a polyisocyanate are also employed.

Useful chain extenders include low molecular weight (i.e. less than about 400) polyfunctional compounds capable of reaction with an isocyanate. Typical examples include amino alcohols; such as methyldiethanolamine, ethanolamine, diethanolamine and glycols; such as 1,4 butanediol and ethylene glycol; aliphatic diamines; and aromatic diamines such as: 1-methyl-3,5-diethyl-2,4-diaminobenzene, 1-methyl-3,5-diethyl-2 6-diaminobenzene (both of these materials are also called diethyltoluene diamine or DETDA), tert-butyl toluene diamine 1,3,5-triethyl-2,6 diaminobenzene, 3,5,3',5'-tetraethyl 4,4"-diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6-diaminobenzene. It is also possible to include some aliphatic chain extender materials as described in U.S. Pat. Nos. 4,246,363 and 4,269,945.

In preparing the polyurea elastomer, it is believed that the polyisocyanate sets forth in the discussion of polyurea and polyurethane urea foams are appropriate. In particular, the most preferred aromatic polyisocyanate for use in polyurea elastomers is MDI (4,4'diphenyl methane diisocyanate) or its derivatives, including prepolymers. Such derivatives include liquid forms as described in U.S. Pat. No. 3,394,164 and so called modified forms as described in U.S. Pat. No. 3,152,162. The liquid forms of MDI are preferred because pure MDI is a solid and can be difficult to use.

Preferably the amount of isocyanate used is the stoichiometric amount based on all the ingredients in the formulation or greater than the stoichiometric amount where the stoichiometric amount of isocyanate is equal to the sum of the number of equivalents of chain-extender and N-(polyoxyalkyl)-N-(alkyl)amine.

As mentioned above, additional catalysts are not necessary, although they may be employed, in preparing elastomers. In a preferred embodiment, no added catalysts are employed.

Other conventional formulation ingredients may be employed as needed such as for example, stabilizers, also known as silicone oils or emulsifiers. The stabilizers may be an organic silane or siloxane.

Reinforcing materials, if desired, known to those skilled in the art may also be employed. For example, chopped or milled glass fibers, chopped or milled carbon fibers and/or other mineral fibers are useful.

Post curing of the elastomer is optional although post curing will improve some properties such as heat sag. Employment of post curing depends on the desired properties of the end product.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Definitions

Polyol #1 =A polyoxyalkylene oxide triol produced from propylene oxide and glycerine. The product has an hydroxyl number of 34 mg KOH/g.

Polyol #2 =A polyoxyalkylene Oxide diol produced from propylene oxide and propylene glycol. The product has an hydroxyl number of 264 mg KOH/g.

Polyol #3 =A polyoxyalkylene oxide triol produced from propylene oxide and glycerine (polymerized at 105° C.). The product has an hydroxyl number of 28 mg KOH/g.

Polyol #4 =A polyoxyalkylene oxide triol produced from propylene oxide and ethylene oxide having a hydroxyl number of 35.5 mg KOH/g. The ethylene oxide content is 16.5%, present as a cap.

Polyol #5 =A polytetramethyleneglycol diol of about 2000 molecular weight.

Polyol #6 =A polyoxyalkylene oxide diol produced from ethylene oxide with a molecular weight of about 400.

Polyol #7 =A polyoxyalkylene oxide hexol produced from propylene oxide and ethylene oxide and sorbitol. The final product has an hydroxyl number of 28 mg KOH/g. The ethylene oxide content is 10% by weight, present as an internal block.

Polyol #8 =A polyoxyalkylene oxide triol produced from propylene oxide and glycerine. The final product has an hydroxyl number of 650 mg KOH/g.

T-5000 =A 5000 MW triamine in which a triol was aminated with ammonia to arrive at an all primary triamine similar to those taught in U.S. Pat. No. 3,654,370. The product was purchased from Texaco Chemical Company under the designation Jeffamine ™ T-5000.

Catalyst #1 =A nickel catalyst sold commercially by Harshaw/Filtrol Partnership as "Nickel 5136P".

Catalyst #2 =Raney nickel sold commercially by Activated Metals.

Catalyst #3 =70% bis(dimethylaminoethyl) ether in dipropylene glycol.

Catalyst #4 =33% triethylenediamine in dipropylene glycol.

Catalyst #5 =A copper catalyst sold commercially by Calsicat as E-508TU, 82% copper oxide on aluminum oxide.

Catalyst #6 =A nickel catalyst sold commercially by Harshaw/Fitrol Partnership as Ni-3288, a one sixteenth inch nickel extrudate.

Surfactant #1 = polysiloxane polyether block copolymer sold by Union Carbide as L-5340.

Surfactant #2 = polysiloxane polyether block copolymer sold by Union Carbide as L-5421.

Surfactant #3 = polysiloxane polyether block copolymer sold by Union Carbide as Y-10,184.

Isocyanate A = An MDI variant known as Isonate (TM) 143 L sold by Dow Chemical.

Isocyanate B = Toluene diisocyanate (80% 2,4; 20% 2,6).

Isocyanate C = Meta-tetramethylxylylene diisocyanate sold by Cyanamide.

Isocyanate D = An MDI prepolymer isocyanate sold by Dow Chemical as Code 205.

Chain Extender A = diethyl toluenediamine sold by Lonza.

Foam Modifier A = a foam modifier prepared according to example 7 of EPC application publication number 220,297 published May 6, 1987 (also U.S.S.N. 791,5145 filed Oct. 25, 1985).

EXAMPLE 1

Preparation of 5000 MW N-(polyoxyalkyl)-N-alkyl-)amine. Polyol #1 (999.1 g 0.605 eq.), isopropylamine (318.9 q 5.39 moles) and Catalyst #1 (25 g) were charged to an autoclave (2 liter). This system was pressurized and vented 5 times with hydrogen, and then pressurized to 500 psig. The reactor was heated to 240° C for 12 hrs. After cooling, the catalyst was removed by filtration and the excess amine by vacuum stripping. The isolated amine terminated polyol had an amine number of 0.515 meq/g, a conversion of 93% and contained 5.0% coupling product. Secondary amine content of this particular product was not measured. Subsequent analysis of another batch made under identical conditions indicated that the primary amine content was 50%, the secondary amine content 50% both measured as a percentage of total reactive amine, total amine minus tertiary amine, and the tertiary level was 0.037 meq/g.

EXAMPLE 2

Preparation of a 10,000MW Diol - A five gallon autoclave was charged with 1600 g of Polyol #2 dehydrated to 0.011% water, 1600 g heptane and 10 g of zinc hexacyanocobaltate. The reactor was purged with nitrogen and evacuated to 2 psia at room temperature. The catalyst was activated for 2.5 hr. at 80° C and 380 g (20 psi partial pressure) of propylene oxide fed. Almost no induction period was observed and pressure dropped as soon as cookout began. Propoxylation was continued at 80° C. The reaction was fast and addition rate was controlled by the ability of the system to remove heat. A total of 21,242 g of propylene oxide was fed. The polyol was stripped to remove all volatiles. Analysis showed that the polyol had an hydroxyl number of 21.0 mg KOH/g, an unsaturation of 0.009 meq/g, a water content of 0.014%, and a viscosity of 2566 cks.

EXAMPLE 3

Preparation of 10,000 MW N-(polyoxyalkyl)-N-(alkyl)amine (difunctional). The procedure used was that of Example 1. Polyol from Example #2 , 800 g (0.1697 eq), isopropylamine 225.9 g (3.82 m, Catalyst #1, 28 g (3.5% on polyol) and hydrogen (200 psi) were heated to 220° C for 6 hr. A product with an amine number of 0.183 meq/g and a conversion of 87.1% was obtained.

Secondary amine content was 59% and primary amine was 41%.

EXAMPLE 4-10

The general procedure used was that of Example 1. In some cases, autoclaves of different sizes were utilized, but the reaction conditions were the same. In each of the following experiments, Polyol #3 was allowed to react with a 10 fold excess of the indicated secondary amine for about 19 hr. under the following conditions: Catalyst charge 3.5% on polyol, initial hydrogen pressure 200 psi, reaction temperature 190° C. The results are shown below:

| Ex | Amine | Amine #* | Conv, % | Sec. % | Pri. % | Tert* |
|----|-------|----------|---------|--------|--------|-------|
| 4  | Diethyl | 0.418 | 85.3 | 65.3 | 33.7 | 0.0044 |
| 5  | Di-n-propyl | 0.376 | 76.7 | 74.3 | 25.7 | 0.019 |
| 6  | Diisobutyl | 0.386 | 78.7 | 96.0 | 4.0 | 0.065 |
| 7  | Di-n-butyl | 0.450 | 91.8 | 84.6 | 15.5 | 0.046 |
| 8  | Diisopropyl | 0.474 | 96.7 | 73.0 | 27.0 | 0.0074 |
| 9  | Diphenyl | 0.464 | 95.0 | 93.6 | 6.4 | 0.014 |
| 10 | Dicyclohexyl | 0.412 | 87.6 | 100.0 | 0.0 | 0.003 |

*in meq/g.

EXAMPLE 11

Preparation of N-(polyoxyalkyl)-N-C-(alkyl)amine from polyol #3 using a mixed amine feed. The procedure used was that of Example #1. Polyol #3, 800 g, diisopropylamine, 308 g, isopropylamine, 44 g, Catalyst #1, 28 g and hydrogen, 200 psi were added to a 2 liter autoclave. The mixture was heated to 190° C. for 20.5 hr. The catalyst was removed by filtration and the excess amine by vacuum stripping. The isolated product had the following analysis: Total amine #0.457 meq/g, conversion 97.2%, secondary amine 90%, primary amine 10% and tertiary amine 0.017 meq/g.

EXAMPLE 12

Preparation of about a 2000 molecular weight N-(polytetramethyleneoxy)-N-(alkyl)amine using a secondary amine with Catalyst #1. The procedure used was that of Example #1. Polyol #5 515.9 g), diisopropylamine (523.8 g), and Catalyst #1 (23.3 g) were charged to a 2 liter reactor. The reactor was purged with hydrogen to remove air and pressurized to 200 psi with hydrogen. The system was heated to 190 C. and held at temperature for about 21.5 hours. Filtration of the catalyst and removal of the excess volatile materials gave a product with the following analysis: Total amine 0.768 meq/g; conversion 80%; secondary amine 94% and primary amine 6%.

EXAMPLE 13

Preparation of about a 400 molecular weight N-(polyoxyethyl)-N-(alkyl)amine using a secondary amine with a nickel catalyst. The procedure used was that of Example #1. Polyol #6 (538.0 g), diisopropylamine (1357.8 g), and Catalyst #1 (42.6 g) were charged to a 1 gallon reactor. The reactor was purged with hydrogen to remove air and pressurized to 200 psi with hydrogen. The system was heated to 190° C. and held at temperature for about 23.5 hours. Filtration of the catalyst and removal of the excess volatile materials gave a product with the following analysis: Total amine 3.78 meq/g; conversion 91%; secondary amine 92% and primary amine 8%.

EXAMPLE 14

Preparation of a 6000 molecular weight N-(polyoxyalkyl)-N-(alkyl)amine using a secondary amine with Catalyst #5. The procedure used was that of Example #1. Polyol #3 (1620.5 g), diisopropylamine (640.4 g), and Catalyst #5 (42.6 g -tablets were ground to powder under an inert atmosphere) were charged to a 1 gallon reactor. The reactor was purged with hydrogen to remove air and pressurized to 200 psi with hydrogen. The system was heated to 190° C. and held at temperature for about 23 hours. Filtration of the catalyst and removal of the excess volatile materials gave a product with the following analysis: Total amine 0.187 meq/g; conversion 50%; secondary amine 93% and primary amine 7%.

EXAMPLE 15

Preparation of 6000MW N-(polyoxyalkyl)-N-(alkyl)amine with high secondary amine content via the continuous process. Catalyst #6, 284.5g was charged to a vertical six foot long one inch OD tube (high pressure tubing) equipped with controlled heaters and a hydrogen inlet. The catalyst was activated at 150° C. with hydrogen. A mixture of Polyol #3 (66.4%) and diisopropylamine 33.6%) was prepared for subsequent feed to the tubular reactor. Feed was initiated and the following conditions established: Pressure 1000 psi; feed rate 627g/hr; Temperature 210° C.; hydrogen flow 22 standard cc/min. A sample was collected after equilibration of the conditions. After removal of the excess amine by vacuum stripping, the product had the following analysis: Total amine 0.404 meq/g; conversion 82%; secondary amine content 73%; primary amine content 27%.

EXAMPLE 16

Another run was carried out as in Example 15 at 210° C. and 293 g/hr. and gave the following product: Total amine 0.422 meq/g; conversion 86%; secondary amine 58%; primary amine 42%.

EXAMPLE 17

Preparation of a 2000 equivalent weight (about 12,000 molecular weight) hexafunctional N-(polyoxyalkyl) N-(alkyl)amine containing high secondary amine content. Polyol #7 (3000 g) diisopropylamine (1528 9 g) and Catalyst 1 (105 g) were charged to a 2 gallon autoclave. The reactor was pressurized with hydrogen and vented to remove air and then pressurized to 200 psi with hydrogen and sealed. The mixture was then heated for 19 hours at 190° C. After cooling, filtration and vacuum stripping, the isolated product had the following analysis: Total amine 0.406 meg/g; conversion 86%; secondary amine 75.1%; primary amine 24.9%.

EXAMPLE 18

Preparation of low molecular weight trifunctional N-(polyoxyalkyl)-N-(alkyl)amine containing high secondary amine content. Polyol #8 (600 g) diisopropylamine (3517.6 g) and Catalyst 1 (21 g) were charged to a 2 gallon autoclave. The reaction was pressurized with hydrogen to remove air and then pressurized to 200 psi with hydrogen and sealed. The mixture was then heated for 19 hours at 190° C. After cooling, filtering and vacuum stripping, the isolated product had the following analysis: Total amine 5.62 meg/g; conversion 71.4%; secondary amine 95%; primary amine 5%.

Use of N-polyoxyalkyl)-N-(alkyl)amines in Elastomers Reactivity Study

The relative reactivity of the product from Example 1. The slower rate of the product from Example 1 was confirmed in a series of gel formation studies with different isocyanates. In all cases, T-5000 controls were run for comparison. In these experiments, the product from Example 1 and T-5000 were allowed to react with either an aromatic isocyanate (Isocyanate A, MDI variant) or an aliphatic isocyanate (Isocyanate C, m-tetramethylxylylene diisocyanate) to form the corresponding soft segment gel. Relative gel times were determined and are shown below:

| Product | Relative Gel Times, sec | |
|---|---|---|
| | Isocyanate A | Isocyanate C |
| T-5000 | 4 | 25 |
| Example 1 | 5 | ca. 400 |

The amines reacted at a rapid rate with Isocyanate A with the product from Example 1 appearing slightly slower (Note: Several runs were compared and gel times were averaged for accurate comparison). However, it is also important to note that the product from Example 1 consistently gave a higher quality gel (very elastomeric, not tacky) with Isocyanate A implying more controlled reaction with this MDI variant. On the other hand, T-5000 consistently gave a gel which contained significant amount of unreacted amine and was consequently quite tacky even on standing.

With the Isocyanate C, the product from Example 1 was significantly slower than T-5000.

RIM Processing/Physical Properties

The product from Example 1 was evaluated against T-5000 in a standard polyurea formulation on Mini-RIM equipment. The trial provided comparison of relative processability (i.e. flow in mold) and over twenty polyurea elastomer plaques were prepared for property determination.

Processing

A study of mold fill, flow front profiles and mixing in the aftermixer area confirmed that the product from Example 1 system reacted slightly slower than T-5000. The small mold and machine used in this trial precluded a more rigorous evaluation of processing, but the results suggest the potential of better mold filling with the product from Example 1.

Physical Properties

Properties of the polyurea elastomers prepared in the trial were determined on post cured (1 hr @375° F.) and non-cured samples and are presented in Table I, Examples 19-22. In addition to the standard tensile properties, sag response and flexural moduli were also evaluated. Clearly the product from Example 1 based polyureas have properties slightly better or comparable to those containing T 5000.

Dynamic mechanical properties (see Table II) of the polyureas were studied over the temperature range from −120° to +240° C. Performance of the elastomer prepared from the amine of Example 1 was outstanding. Both elastomer systems showed the expected low temperature transition (Tg) at −53° C. and neither system showed any significant higher temperature transition (Tm). However, the elastomer prepared from the amine of Example 1 had a substantially better modulus multiple over a broad use temperature range.

DETAILED RIM PROCESS STUDY

The amine evaluated in this study was prepared by directed amination of Polyol #1 with isopropylamine according to Example 1.

The resin component was comprised of amine polyether (69.4%) and Chain Extender A (30.5%). No catalyst was used. The isocyanate was Isocyanate D, a 17.5% free NCO soft block prepolymer based on MDI. The ratio of resin to isocyanate was 1.2/1.0 at 105 index.

The machine used to prepare the plaques was a Mini-RIM unit as described in U.S. Pat. No. 4,189,070. The resin component was heated to 55°-60° C. and the isocyanate to 60°-65° C. The mold temperature was 120° C. Average shot time to fill the mold used was 0.5 sec., and most plaques were demolded after one minute (no demold time study was attempted). Twenty-one plaques (8 based on T-5000 and 13 based on the product from Example 1) were prepared for properties. Tensile and tear properties were determined on cut samples using ASTM Standard tests.

TABLE I
PHYSICAL PROPERTIES
Properties of polyureas are shown below.
All materials were based on amine, Chain Extender A and Isocyanate D.

|  | Example 19 T-5000 | Example 20 T-5000 | Example 21 Example 1 | Example 22 Example 1 | ASTM Method |
|---|---|---|---|---|---|
| Amine |  |  |  |  |  |
| Post Cure | None | 190° C. | None | 190° C. | N/A |
| Time | — | 1 Hr | — | 1 Hr | N/A |
| Property |  |  |  |  |  |
| Hardness Shore D | 65 | 64 | 65 | 66 | D-2240 |
| Density, pcf | 67 | 67 | 67 | 67 | N/A |
| Tensile, psi | 4000 | 4400 | 4120 | 4100 | D-412 |
| Elong., % | 320 | 320 | 354 | 300 | D-412 |
| C Tear, pli | 566 | 621 | 559 | 636 | D-624C |
| 6" Sag, 120° C., in. | 0.25 | 0.14 | 0.24 | 0.05 | * |
| 6" Sag, 175° C., in. | 1.22 | 0.29 | 1.06 | 0.28 | * |
| Flex Mod., Mpsi × $10^{-3}$ |  |  |  |  | D-790 |
| @ −20° C. | 113 | 102 | 115 | 90 |  |
| @ 23° C. | 55 | 60 | 56 | 57 |  |
| @ 70° C. | 44 | 47 | 47 | 44 |  |
| -29/70 multiple | 2.6 | 2.1 | 2.5 | 2.0 |  |

*General Motors Chevrolet Division Test Method CTZZZ006AA

TABLE II
DYNAMIC MECHANICAL DATA* (POST-CURED SAMPLES)

|  | Shear Modulus (G') in Mpsi | |
|---|---|---|
| Amine | T-5000 | Example 1 |
| Temp. °C. |  |  |
| −29 | 125 | 130 |
| +23 | 64 | 78 |
| +70 | 53 | 62 |
| +202 | 38 | 46 |
| +240 | 23 | 36 |
| Multiple |  |  |
| −20/+70 | 2.4 | 2.1 |
| −20/+202 | 3.3 | 2.8 |
| −20/+242 | 5.4 | 3.6 |

*Rheovibron Mechanical Spectrometer, 2° C./minute

Use of N-(polyoxyalkyl)-N-(alkyl)amines in foams.

A standard foam formulation was used in the evaluation of all amine terminated polyethers in this study. The formula was:

| Polyether or Amine | 100 php |
|---|---|
| Water | 4.0 |
| Catalyst 3 | 0.1 |
| Catalyst 4 | 0.4 |
| Surfactant 1 | 2.0 |
| Surfactant 2 | 2.0 |
| Foam Modifier 1 | 2.0 |
| Isocyanate B | 105 Index |

The foams were made by mixing the ingredients in a container on a drill press equipped with a turbine blade stirrer. The stirring speed was 4000 rpm. The polyether, water, catalysts, surfactants and other additives except the isocyanate were all added to the mixing container and stirred for 60 sec. The mixture was allowed to stand 15 sec. Stirring was started again, the isocyanate added, and stirred an additional 6 sec. This mixture was then rapidly poured into a 9×9×4 inch box and allowed to foam. Each foam was subsequently cured for 5 min. at 120° C.

One control foam was made using a conventional polyol (Polyol #4) for general comparison with foams from the amine terminated polyethers. This foam was made from the same ingredients with the exception that Surfactant 1 and Surfactant 2 were replaced with Surfactant 3. No problems were encountered in mixing or pouring the ingredients. The foam expanded to fill the container and showed a tendency to shrink when cooling after being cured.

Polyurea foams were made from N-(polyoxyalkyl)-N-(alkyl)amine as prepared in Example 1 and from T-5000. When T-5000 was used it was not possible to make a foam. Gel formation started as soon as the isocyanate was added. The reaction was so fast that no material could be poured from the mixing container. When the amine from Example 1 was used in the above foam formulation, no significant handling problems were encountered. Mixing was easily accomplished, and the mixture was readily poured into the foam container. The overall reaction rate appeared to be slightly faster than observed with Polyol #4, but certainly not approaching that of T-5000. The resultant foam completely filled the container, and there was no tendency for it to shrink after curing for 5 min. at 120° C. For a general summary, see Example 23-26 in Table III.

TABLE III
FOAMS FROM VARIOUS POLYETHER POLYOLS OR POLYETHER AMINE

|  | Example 23 | Example 24 | Example 25 | Example 26 |
|---|---|---|---|---|
| Polyol or Polyether Amine | Polyol #4 | From Ex #8 | From Ex #1 | T-5000 |
| Reactive End Group | Hydroxyl | 73/27 2°/1° amine | 50/50 2°/1° amine | 100% 1° amine |
| Comments on Foam | No problem Good foam | No problem Good foam | No problem Good foam | Too fast |

We claim:

1. A amine mixture of the general formula:

$$R\begin{matrix}[H]_{(hz)}\\ \begin{bmatrix}(P)_p\\(S)_s\\(T)_t\end{bmatrix}_{z-(hz)}\end{matrix}$$

wherein:

R represents an initiator radical based on a compound containing Zerewitinoff active hydrogen atoms;

H represents a hydroxy-containing group of the formula:

$$(CH_2CH_2-O)_a(CH_2-\underset{\underset{CH_3}{|}}{CH}-O)_b(CH_2\underset{\underset{R'}{|}}{CH}-O)_c-(CH_2)_n\underset{\underset{R''}{|}}{CH}-OH;$$

P represents a primary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-(CH_2)_n\underset{\underset{R''}{|}}{CH}-NH_2;$$

S represents a secondary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$
$$-(CH_2)_n\underset{\underset{R''}{|}}{CH}-NH-R''';$$

T represents a tertiary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$
$$-(CH_2)_n\underset{\underset{R''}{|}}{CH}-NR'''R'''';$$

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R'' is hydrogen or an alkyl group containing up to eighteen carbon atoms;
R''' and R'''' are independently alkyl groups containing from two to twelve carbon atoms;
h is from 0 to 0.7;
p is from 0 to less than 0.5;
s is from 0.5 to 1.0;
t is from 0 to 0.15;
(hz) is the product of h and z;
p+s+t=1; and
z is an integer derived from the number of Zerewitinoff active hydrogens on the initiator, with the proviso that when z is 2 and a and c are both zero, then b must be greater than 22.

2. The amine of claim 1 wherein:
R contains from two to six carbon atoms,
a is 0 to 50,
b is 20 to 115,
c is 0 to 15,
R' is an alkyl group containing two carbon atoms,
R''' contains from two to six carbon atoms, and
z is 2 to 6.

3. The amine of claim 2 wherein:
R contains from three to six carbon atoms,
a is 0 to 90,
b is 25 to 98,
c is 0 to 2,
R' is an isopropyl group, and
z is 3 to 6.

4. The amine of claim 1 wherein R has a molecular weight of 18 to 400.

5. The amine of claim 3 wherein R is $$\begin{matrix}CH_2-CH-CH_2\\ |\quad\;\; |\quad\;\; |\\ O\quad O\quad O\\ |\quad\;\; |\quad\;\; |\end{matrix}$$

6. A amine mixture of the general formula:

$$R\begin{matrix}[H]_{(hz)}\\ \begin{bmatrix}(P)_p\\(S)_s\\(T)_t\end{bmatrix}_{z-(hz)}\end{matrix}$$

wherein:
R represents an initiator radical based on a compound containing Zerewitinoff active hydrogen atoms;
H represents a hydroxy-containing group of the formula:

$$(CH_2CH_2-O)_a(CH_2-\underset{\underset{CH_3}{|}}{CH}-O)_b(CH_2\underset{\underset{R'}{|}}{CH}-O)_c-(CH_2)_n\underset{\underset{R''}{|}}{CH}-OH;$$

P represents a primary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c(CH_2)_n\underset{\underset{R''}{|}}{CH}-NH_2;$$

S represents a secondary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$

$$-(CH_2)_n\underset{\underset{R''}{|}}{CH}-NH-R''';$$

T represents a tertiary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$

$$-(CH_2)_n\underset{\underset{R''}{|}}{CH}-NR'''R'''';$$

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R'' is hydrogen or an alkyl group containing up to eighteen carbon atoms;
R''' and R'''' are independently alkyl groups containing from two to twelve carbon atoms;
h is from 0 to 0.3;
p is from 0 to 0.4;
s is from 0.7 to 1.0;
t is from 0 to 0.05;
(hz) is the product of h and z;
p+s+t=1;
z is 2 to 6 with the proviso that when z is 2 and a and c are both zero, then b must be greater than 22, and where the equivalent weight of the amine is from about 1,000 to 10,000.

7. The amine of claim 6 wherein:
R contains from two to six carbon atoms,
a is 0 to 150,
b is 20 to 115,
c is 0 to 15,
R' is an alkyl group containing two carbon atoms,
R''' contains from two to six carbon atoms, and
z is 2 to 6.

8. The amine of claim 7 wherein:
R contains from three to six carbon atoms,
a is 0 to 90,
b is 25 to 98,
c is 0 to 2,
R''' is an isopropyl group, and
z is 3 to 6.

9. The amine of claim 6 wherein R has a molecular weight of 18 to 400.

10. The amine of claim 8 wherein R is $$\begin{array}{c} CH_2-CH-CH_2. \\ | \quad | \quad | \\ O \quad O \quad O \\ | \quad | \quad | \end{array}$$

11. A amine mixture of the general formula:

$$R\underset{}{\overset{[H]_{(hz)}}{\diagdown}}\left[\begin{array}{c}(P)_p\\(S)_s\\(T)_t\end{array}\right]_{z-(hz)}$$

wherein:
R represents an initiator radical based on a compound containing Zerewitinoff active hydrogen atoms;
H represents a hydroxy-containing group of the formula:

$$(CH_2CH_2-O)_a(CH_2-\underset{\underset{CH_3}{|}}{CH}-O)_b(CH_2\underset{\underset{R'}{|}}{CH}-O)_c-(CH_2)_n\underset{\underset{R''}{|}}{CH}-OH;$$

R represents a primary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c(CH_2)_n\underset{\underset{R''}{|}}{CH}-NH_2;$$

S represents a secondary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$

$$-(CH_2)_n\underset{\underset{R''}{|}}{CH}-NH-R''';$$

T represents a tertiary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$

$$-(CH_2)_n\underset{\underset{R''}{|}}{CH}-NR'''R'''';$$

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R'' is hydrogen or an alkyl group containing up to eighteen carbon atoms;
R''' and R'''' are independently alkyl groups containing from two to twelve carbon atoms;
h is from 0 to 0.15;
p is from 0 to 0.4;
s is from 0.7 to 1.0;
t is from 0 to 0.05;
(hz) is the product of h and z;

p+s+t=1; and
z is 3 to 6.

12. The amine of claim 11 wherein:
R contains from two to six carbon atoms,
a is 0 to 150,
b is 20 to 115,
c is 0 to 15,
R' is an alkyl group containing two carbon atoms, and
R''' contains from two to six carbon atoms.

13. The amine of claim 12 wherein:
R contains from three to six carbon atoms,
a is 0 to 90,
b is 25 to 98,
c is 0 to 2, and
R''' is an isopropyl group.

14. The amine of claim 11 wherein R has a molecular weight of 18 to 400.

15. The amine of claim 14 wherein R is

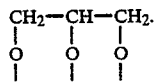

16. A amine mixture of the general formula:

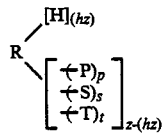

wherein:
R represents an initiator radical based on a compound containing Zerewitinoff active hydrogen atoms;
H represents a hydroxy-containing group of the formula:

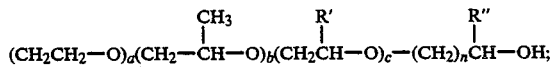

P represents a primary amine-containing group of the formula:

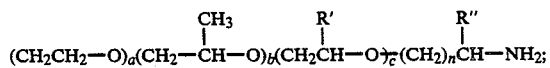

S represents a secondary amine-containing group of the formula:

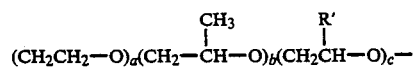

-continued $$-(CH_2)_n\overset{R''}{\underset{|}{CH}}-NH-R''';$$

T represents a tertiary amine-containing group of the formula:

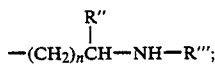
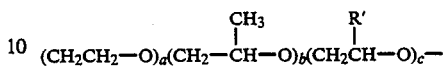
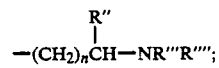

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R'' is hydrogen or an alkyl group containing up to eighteen carbon atoms;
R''' and R'''' are independently alkyl groups containing from two to twelve carbon atoms;
h is from 0 to 0.15;
p is from 0 to less than 0.4;
s is from 0.67 to 1.0;
t is from 0 to 0.05;
(hz) is the product of h and z;
p+s+t=1;
z is 3 to 6; and
the equivalent weight of the amine is from about 1,000 to 10,000.

17. The amine of claim 16 wherein:
R contains from three to six carbon atoms,
a is 0 to 150,
b is 20 to 115,
c is 0 to 15,
R' is an alkyl group containing two carbon atoms, and
R''' contains from two to six carbon atoms.

18. Amine of claim 17 wherein:
a is 0 to 90,
b is 25 to 98,
c is 0 to 2, and
R''' is an isopropyl group.

19. The amine of claim 16 wherein R has a molecular weight of 18 to 400.

20. The amine of claim 19 wherein R is

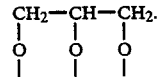

* * * * *

UNITED STATES PATENT AND TRADEMARK OFFICE
CERTIFICATE OF CORRECTION

PATENT NO. : 4,902,777

DATED : February 20, 1990

INVENTOR(S) : Richard M. Gerkin; David J. Schreck; Danny E. Smith

It is certified that error appears in the above-identified patent and that said Letters Patent is hereby corrected as shown below:

Column 1, line 59, "polyols)" should read --(polyols)--.

Column 3, line 13, "N-(polyoxyalkyl)-N-(alyl)amines" should read --N-(polyoxyalkyl)-N-(alkyl)amines--.

Column 3, line 32 "$R[H]_{(hz)}[(P)_p(S)_s(T)_t]_{2-(hz)}$" should read $R[H]_{(hz)}[(P)_p(S)_s(T)_t]_{z-(hz)}$--.

Column 3, line 63, "etc." should read --etc.)--.

Column 4, line 58, "R''" should read --R'--.

Column 8, line 30, "lycol" should read --glycol--.

Column 10, line 25, "Oxide" should read --oxide--.

Column 11, line 25, "(318.9 q 5.39 moles" should read --(318.9g 5.39 moles--.

UNITED STATES PATENT AND TRADEMARK OFFICE
CERTIFICATE OF CORRECTION

PATENT NO. : 4,902,777
DATED : February 20, 1990
INVENTOR(S) : Richard M. Gerkin; David J. Schreck; Danny E. Smith Page 2 of 3

It is certified that error appears in the above-identified patent and that said Letters Patent is hereby corrected as shown below:

Column 12, line 28, "N-(polyoxyalkyl)-N-C-(alkyl)amine" should read --N-(polyoxyalkyl)-N-(alkyl)amine--.

Column 12, line 44, "515.9g)" should read --(515.9g)--.

Column 13, line 26, "33.6%)" should read --(33.6%)--.

Column 13, line 47, "(1528 9g)" should read --(1528.9g)--.

Column 14, line 31, insert --a-- before the word "significant".

Column 18, Claim 3, line 6, "R'" should read --R'''--.

Column 20, Claim 11, line 25, "R" should read --P--.

UNITED STATES PATENT AND TRADEMARK OFFICE
CERTIFICATE OF CORRECTION

PATENT NO. : 4,902,777

DATED : February 20, 1990

INVENTOR(S) : Richard M. Gerkin, et al

It is certified that error appears in the above-identified patent and that said Letters Patent is hereby corrected as shown below:

Column 16, line 30, "0.67" should read --0.7--.

Signed and Sealed this

Eleventh Day of February, 1992

Attest:

HARRY F. MANBECK, JR.

*Attesting Officer*  *Commissioner of Patents and Trademarks*